(12) United States Patent
Bonen

(10) Patent No.: US 11,044,227 B1
(45) Date of Patent: Jun. 22, 2021

(54) RPD MAC ADDRESS STORED IN NODE

(71) Applicant: Harmonic, Inc., San Jose, CA (US)

(72) Inventor: Adi Bonen, Belle Mead, NJ (US)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 16/155,687

(22) Filed: Oct. 9, 2018

Related U.S. Application Data

(60) Provisional application No. 62/570,609, filed on Oct. 10, 2017.

(51) Int. Cl.
*H04L 29/12* (2006.01)
*H04L 12/24* (2006.01)
*H04Q 11/00* (2006.01)

(52) U.S. Cl.
CPC ........ *H04L 61/6022* (2013.01); *H04L 41/085* (2013.01); *H04L 41/0893* (2013.01); *H04Q 11/0067* (2013.01); *H04Q 2011/0073* (2013.01)

(58) Field of Classification Search
CPC ............... H04L 61/6022; H04L 41/085; H04L 41/0893; H04Q 11/067
See application file for complete search history.

(56) References Cited

U.S. PATENT DOCUMENTS

2006/0059325 A1\* 3/2006 Milne ................. G06F 13/4081
711/200
2013/0070765 A1\* 3/2013 Chapman ............ H04L 12/2801
370/390

\* cited by examiner

*Primary Examiner* — Ricky Q Ngo
*Assistant Examiner* — Stephen N Steiner
(74) *Attorney, Agent, or Firm* — Brokaw Patent Law PC; Christopher J. Brokaw

(57) ABSTRACT

Approaches for, and articles of manufacturer that embody, dynamic assignment of a MAC address. A remote PHY node may comprise a non-volatile memory and a network element that comprises a CPU. For example, the network element may be a remote PHY device, an Ethernet switch, a Remote MACPHY Device (RMD), a Passive Optical Network (PON) Optical Line Terminal (OLT), a Passive Optical Network (PON) Optical Network Unit (ONU), or a Wi-Fi hot spot router. A communication link exists between the CPU of the network element and the non-volatile memory of the remote PHY node. A module on the network element causes the network element to retrieve, across the communication link, a MAC address from the non-volatile memory of the remote PHY node and adopt the MAC address to identify itself any time that the network element reboots.

6 Claims, 3 Drawing Sheets

RPD MAC ADDRESS STORED IN NODE

CLAIM OF PRIORITY

The present application claims priority to U.S. Provisional Patent Application No. 62/570,609, entitled "RPD MAC Address Stored in LMB," filed Oct. 10, 2017, the disclosure of which is hereby incorporated by reference for all purposes in its entirety as if fully set forth herein.

FIELD OF THE INVENTION

Embodiments of the invention generally relate to the field of maintenance and repair of remote PHY nodes (RPNs).

BACKGROUND

A Converged Cable Access Platform (CCAP) is an industry standard platform for transmitting video data and voice content. The CCAP is led by CableLabs of Sunnyvale, Calif. CCAP unifies the Converged Multiservice Access Platform (CMAP), managed by Comcast Corporation of Philadelphia, Pa., with the Converged Edge Services Access Router platform (CESAR), which is managed by Time Warner Cable, Inc of New York, N.Y.

CableLabs has publicly issued a Remote PHY family of specifications, known as the MHAv2 specifications (Modular Headend Architecture version 2). These specifications describe how a CCAP platform may be separated into two components, (1) a CCAP Core located at a cable headend, and (2) a Remote PHY device (RPD), which is typically located outdoors. An RPD may be located, for example, at the junction of the fiber and coax plants in an optical node serving as a Remote PHY Node (RPN). A CCAP core can control and setup data paths with multiple RPDs situated in multiple fiber nodes. FIG. 1 is a block diagram of a CCAP platform which includes an RPD situated inside an RPN in accordance with the MHAv2 specifications of the prior art.

An RPD, depicted in FIG. 1, is a networking element that communicates over Ethernet/IP to other networking devices "northbound" (i.e., in the direction from the RPD to the CCAP Core). In the "southbound" direction (i.e., in the direction from the RPD to the DOCSIS cable modem), the RPD modulates information streams (data, video, voice, etc.) into RF, and demodulates similar such streams from RF.

The RPN that comprises the RPD may also include other elements such as an RF amplifier module, a power supply, and the like. A CPU in the RPD is responsible for controlling the RPD processing, communications with other system elements (such as various northbound servers), controlling local node parameters, and other functions. The RPD is typically a pluggable module into the remote PHY node (RPN).

To perform networking communications, the RPD requires an Ethernet MAC address (which is a globally unique value) that identifies the RPD to the world. The RPD may need multiple Ethernet MAC addresses, as such would be the case if the RPD had a multiple Ethernet ports, since each Ethernet port would need to be uniquely identified by a different MAC address.

Typically, the MAC addresses are stored in a non-volatile memory element (included in the RPD module) during the manufacturing/production of the RPD module, enabling the manufacturer to factory-assign a unique MAC address to the RPD, or a plurality of said MAC addresses if needed. Typically, the stored MAC addresses do not change thereafter for the duration of the device life. Whenever the RPD is booted and gets ready for operation the CPU reads the MAC addresses stored in the non-volatile memory and use them for networking and other communications purposes.

There exists a need for other network elements which communicate with a particular RPD to have a prior knowledge of the MAC addresses assigned to that RPD. The MAC address assigned to the RPD serves as an identifier of the RPD. When the RPD identifies itself through its MAC address through an electronic communication, other network elements can attach further identifying information in the electronic communication for the specific RPD (e.g., IP address, a human-readable node name, and the like), interpret the electronic communication properly, associate the RPD with certain external database information, properly configure and instruct the RPD, and so on. Accordingly, other network elements are often pre-provisioned with, or otherwise informed of, a MAC address that has already been assigned to a particular RPD so that those network elements are ready to start communications with the RPD once the RPD connects to them (e.g., after the RPD is turned on for the first time or reboots).

When an RPD must be replaced (for example, after a hardware failure in the RPD or for functionality upgrade), a technician extracts the old pluggable RPD module from the RPN and inserts a new pluggable RPD module into the RPN. Since the newly inserted RPD has its own assigned MAC addresses different and apart from its predecessor, the physical replacement of the RPD has to be complemented with the re-provisioning all other network elements that need to identify the replaced RPD, replacing all identifiers of the previous RPD with the new identifier, or completely erasing the information database held for the old RPD and replacing that information with a new information database for the new RPD. Such activity greatly complicates the process of maintenance and replacement of failed RPDs.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for simplifying the process of maintenance and replacement of network elements comprised with a remote PHY node (RPN) are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Ethernet MAC addresses are used as an identifier for networking devices, including but not limited to remote PHY device (RPD). Some of these other network devices, especially modular platforms holding a plurality of line cards, are designed to enable replacement of some of their components, e.g., line cards mounted in the platform. To prevent the need to re-provision external networking elements every time that a line card is replaced, these devices often store one or more factory-assigned MAC addresses in a non-volatile memory placed in a non-replaceable part of the platform. Upon reboot, line cards that need MAC addresses obtain those MAC addresses from that non-volatile memory. The non-volatile memory may store Ethernet MAC addresses for a plurality of line cards. A specific MAC address is assigned to each line card according to a platform internal index (e.g., line card number). When a line card is replaced, the new line card that took its place obtains the same MAC address as its predecessor did, thus no re-provisioning of external elements is required, facilitating easier maintenance.

Embodiments of the invention are designed to simplify the process of maintenance and replacement of network element comprised with a remote PHY node (RPN). Embodiments may be used in conjunction with a wide variety of network elements comprised within an RPN, including but not limited to a remote PHY device, an Ethernet switch, a Remote MACPHY Device (RMD), a Passive Optical Network (PON) Optical Line Terminal (OLT), a Passive Optical Network (PON) Optical Network Unit (ONU), and a Wi-Fi hot spot router.

Figure 1:
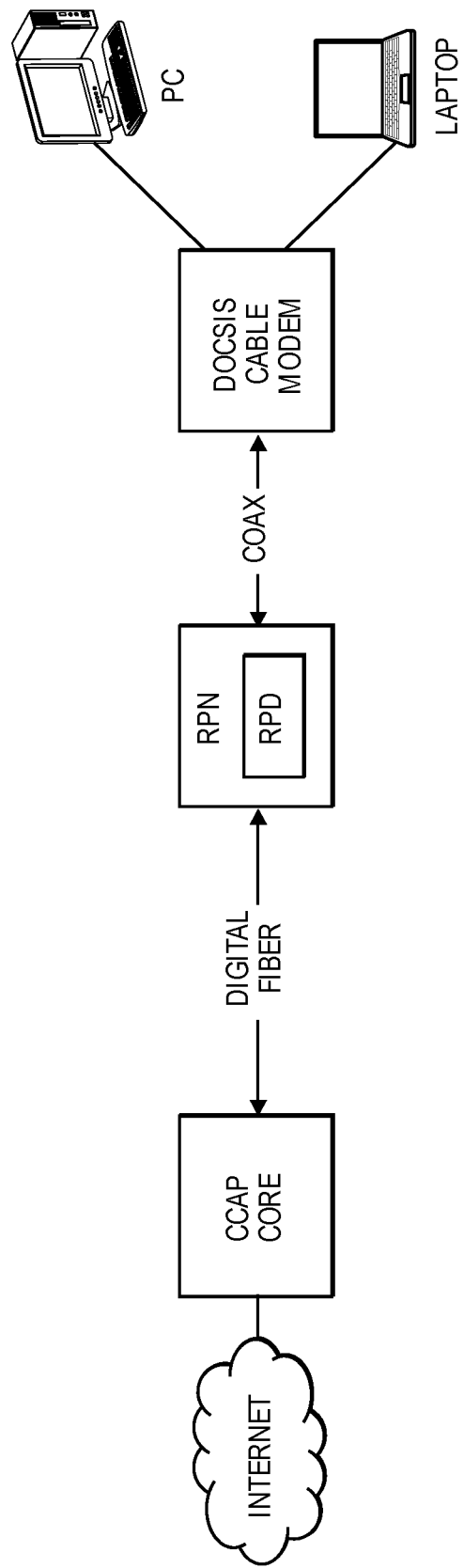
FIG. 1 is a block diagram of a CCAP platform which includes a Remote PHY node (RPN) comprising a remote PHY device according to the prior art.
Figure 2:
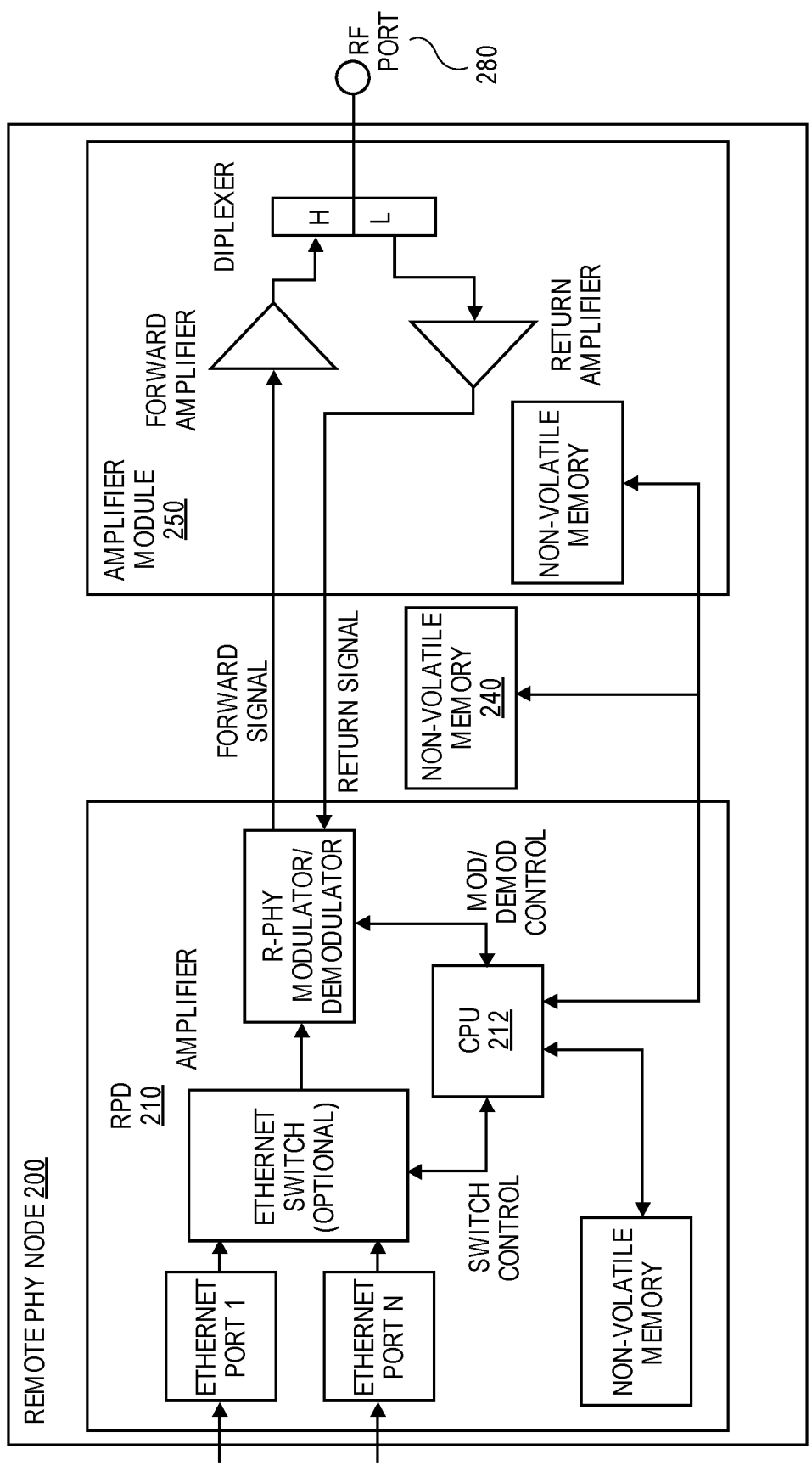
FIG. 2 is a block diagram of an RPN comprising an RPD and RF amplifier module according to an embodiment of the invention.

FIG. 2 is a block diagram of an RPN 200 according to an embodiment of the invention. RPN 200 shown in FIG. 2 comprises a remote PHY device (RPD) 210 and a RF amplifier module 250. Remote PHY node 200 also comprises non-volatile memory 240 and RF port 280. Non-volatile memory 240, as broadly used herein, represents any type of digital storage capable of persistently storing a set of MAC addresses that are assigned to remote PHY node 200 (and which may be subsequently adopted by network elements comprised within remote PHY node 200. In accordance with embodiments of the invention, Ethernet MAC addresses are assigned to remote PHY node 200 rather than (or in addition to) RPD 210.

As shown in FIG. 2, a communication link is established between CPU 212 of RPD 210 to non-volatile memory 240. Upon reboot of RPD 210, CPU 212 of RPD 210 reads the Ethernet MAC addresses assigned to it from non-volatile memory 240. Subsequently, RPD 210 uses those MAC addresses for identifying itself to other communication elements.

Network elements may use MAC addresses in this manner to adopt a MAC address to identify themselves as a singular entity or may adopt a MAC address to identify individual Ethernet ports therein. For example, CPU 212 may retrieve a set of N Ethernet MAC addresses from non-volatile memory 240 upon boot-up. Thereafter, those retrieved Ethernet MAC addresses may be stored in internal volatile memory and assigned to individual Ethernet Ports 1-N of RPD 210.

Advantageously, upon replacement of a pluggable RPD, the new RPD obtains the same Ethernet MAC addresses assigned to its predecessor, and as a result, identifies itself, and its Ethernet ports, with the same Ethernet MAC address(es) as the former RPD. Consequently, there is no need to re-provision other external networking devices with information about the newly replaced RPD module, which greatly eases the burden of maintenance over the prior art.

Non-volatile memory 240 may store Ethernet MAC addresses for a plurality of a node pluggable modules (RPD and/or other modules), and particular MAC addresses may be assigned to each particular pluggable node module according to a node internal index (e.g., node module location number hardwired to the node platform). Various types of node pluggable networking modules can make use of these schemes (such as but not limited to a remote PHY device, an Ethernet switch, a Remote MACPHY Device (RMD), a Passive Optical Network (PON) Optical Line Terminal (OLT), a Passive Optical Network (PON) Optical Network Unit (ONU), and a Wi-Fi hot spot router). Embodiments of the invention may be used in conjunction with various numbers and combinations of modules comprised within an RPN.

Figure 3:
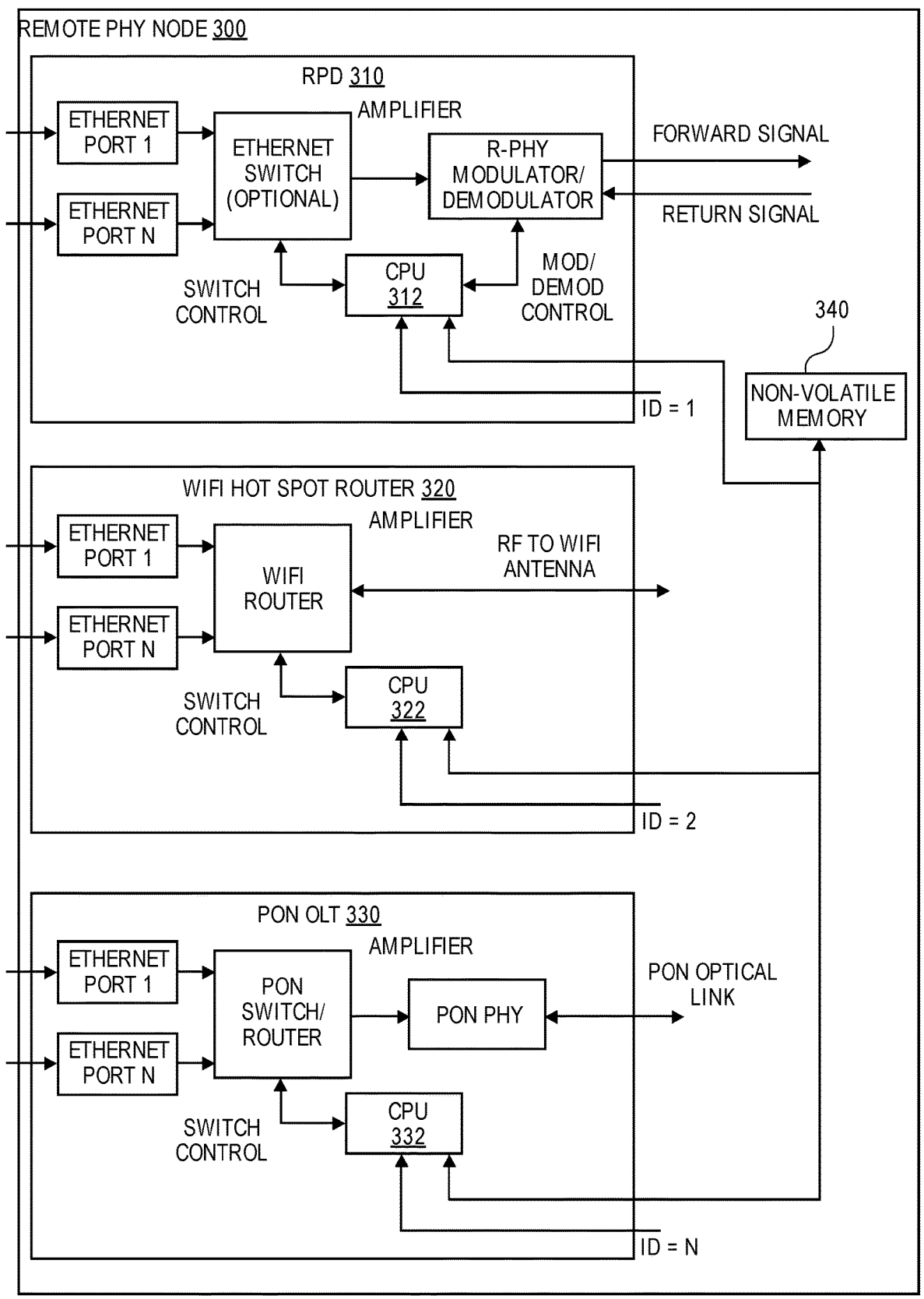
FIG. 3 is a block diagram of an RPN comprising an RPD and two other network elements according to an embodiment of the invention.

To illustrate, consider FIG. 3, which is a block diagram of an RPN 300 comprising RPD 310 and two other network elements, namely Wi-fi hot spot router 320 and Passive Optical Network (PON) Optical Line Terminal (OLT) 330, according to an embodiment of the invention. Each network element in RPN 300 comprises a CPU, e.g., RPD 310 comprises CPU 312, Wi-fi hot spot router 320 comprises CPU 322, and Passive Optical Network (PON) Optical Line Terminal (OLT) 330 comprises CPU 332. Each CPU of a network element of RPN 300 may be used to retrieve one or more MAC addresses from non-volatile memory 340; thereafter, the network element may adopt a retrieved MAC address to identify itself or a port thereon. While RPN 300 depicts three network elements, other embodiments may be implemented using a RPN comprising different numbers and types of network elements.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An article of manufacture, comprising:
    a remote PHY node that comprises (a) a non-volatile memory and (b) a network element that comprises a CPU;
    a communication link between the CPU of the network element and the non-volatile memory of the remote PHY node; and
    a module, implemented by one or more of hardware and software, on the network element which causes the network element to retrieve, across the communication link, a MAC address from said non-volatile memory of the remote PHY node and adopt the MAC address to identify itself each and every time that the network element reboots,
    wherein the non-volatile memory stores a plurality of MAC addresses, and wherein the module uses a node module location number hardwired into the remote PHY node to identify which, of said plurality of MAC addresses, to adopt to identify said network element.

2. The article of manufacture of claim 1, wherein the network element is a remote PHY device.

3. The article of manufacture of claim 1, wherein the network element is an Ethernet switch, a Remote MACPHY Device (RMD), a Passive Optical Network (PON) Optical Line Terminal (OLT), a Passive Optical Network (PON) Optical Network Unit (ONU), or a Wi-Fi hot spot router.

4. A method for assigning a MAC address to a network element, comprising:
- establishing a communication link between a CPU of a network element and a non-volatile memory of a remote PHY node, wherein said network element resides inside of said remote PHY node; and
- each and every time that the network element reboots, the network element retrieving, across the communication link, the MAC address from said non-volatile memory of the remote PHY node and adopting the MAC address to identify itself,
- wherein the non-volatile memory stores a plurality of MAC addresses, and wherein the network element uses a location number hardwired into the remote PHY node to identify which, of said plurality of MAC addresses, to adopt.

5. The method of claim 4, wherein the network element is a remote PHY device.

6. The method of claim 4, wherein the network element is an Ethernet switch, a Remote MACPHY Device (RMD), a Passive Optical Network (PON) Optical Line Terminal (OLT), a Passive Optical Network (PON) Optical Network Unit (ONU), or a Wi-Fi hot spot router.

\* \* \* \* \*